(12) United States Patent
Tsimhoni et al.

(10) Patent No.: US 8,924,150 B2
(45) Date of Patent: Dec. 30, 2014

(54) VEHICLE OPERATION AND CONTROL SYSTEM FOR AUTONOMOUS VEHICLES ON FULL WINDSHIELD DISPLAY

(75) Inventors: Omer Tsimhoni, Raanana (IL); Joseph F. Szczerba, Grand Blanc, MI (US); Thomas A. Seder, Northville, MI (US); Dehua Cui, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 685 days.

(21) Appl. No.: 12/981,206

(22) Filed: Dec. 29, 2010

(65) Prior Publication Data

US 2012/0173069 A1 Jul. 5, 2012

(51) Int. Cl.
| | |
|---|---|
| G09G 5/00 | (2006.01) |
| G01C 21/36 | (2006.01) |
| G06F 7/00 | (2006.01) |
| G02B 27/01 | (2006.01) |
| G02B 27/00 | (2006.01) |
| B60K 35/00 | (2006.01) |

(52) U.S. Cl.
CPC ..... *G02B 27/0093* (2013.01); *B60K 2350/1012* (2013.01); *G01C 21/3664* (2013.01); *G02B 27/01* (2013.01); *G01C 21/365* (2013.01); *B60K 35/00* (2013.01); *G02B 2027/0187* (2013.01); *B60K 2350/2052* (2013.01); *G02B 2027/014* (2013.01)
USPC ............... 701/454; 701/27; 701/36; 701/482; 701/538; 340/691.1; 340/691.6; 340/693.8; 345/7; 345/9; 345/156; 345/158; 345/619; 345/632; 345/633; 345/634

(58) Field of Classification Search
USPC ............... 701/31.4, 2, 25, 300, 301, 33.6, 36, 701/470, 49, 532; 340/436, 425.5, 457.1, 340/691.6; 345/7, 8, 156, 158, 619, 633
See application file for complete search history.

(56) References Cited

U.S. PATENT DOCUMENTS

| | | | |
|---|---|---|---|
| 6,100,517 A | 8/2000 | Yahav et al. | |
| 6,986,581 B2 | 1/2006 | Sun et al. | |
| 7,090,355 B2 | 8/2006 | Liu et al. | |
| 7,182,467 B2 | 2/2007 | Liu et al. | |
| 7,213,923 B2 | 5/2007 | Liu et al. | |
| 7,460,951 B2 | 12/2008 | Altan et al. | |
| 7,605,773 B2 * | 10/2009 | Janssen | 345/7 |
| 8,098,170 B1 | 1/2012 | Szczerba et al. | |
| 8,098,171 B1 | 1/2012 | Szczerba et al. | |
| 2007/0057781 A1 * | 3/2007 | Breed | 340/457.1 |

(Continued)

FOREIGN PATENT DOCUMENTS

WO WO-2007043036 A1 4/2007

OTHER PUBLICATIONS

U.S. Appl. No. 12/467,340, Szczerba et al., not publ'd.
U.S. Appl. No. 12/467,350, Seder et al., not publ'd.

(Continued)

*Primary Examiner* — Adam Tissot (57) ABSTRACT

A method to navigate a vehicle utilizing a graphic projection display, includes monitoring a navigation status graphic representing a navigation intent displayed upon the graphic projection display, monitoring a user input indicated to a portion of the graphic projection display, initiating a user-defined navigation command based on the monitored navigation status graphic and the monitored user input, and operating the vehicle in accordance with the user-defined navigation command.

18 Claims, 5 Drawing Sheets

(56) References Cited

U.S. PATENT DOCUMENTS

| | | |
|---|---|---|
| 2008/0158510 A1 | 7/2008 | Tant et al. |
| 2009/0005961 A1* | 1/2009 | Grabowski et al. ........... 701/200 |
| 2009/0268946 A1 | 10/2009 | Zhang et al. |
| 2010/0020078 A1 | 1/2010 | Shpunt |
| 2010/0253489 A1 | 10/2010 | Cui et al. |
| 2010/0253492 A1 | 10/2010 | Seder et al. |
| 2010/0253493 A1 | 10/2010 | Szczerba et al. |
| 2010/0253526 A1 | 10/2010 | Szczerba et al. |
| 2010/0253539 A1 | 10/2010 | Seder et al. |
| 2010/0253540 A1 | 10/2010 | Seder et al. |
| 2010/0253541 A1 | 10/2010 | Seder et al. |
| 2010/0253542 A1 | 10/2010 | Seder et al. |
| 2010/0253543 A1 | 10/2010 | Szczerba et al. |
| 2010/0253593 A1 | 10/2010 | Seder et al. |
| 2010/0253594 A1 | 10/2010 | Szczerba et al. |
| 2010/0253595 A1 | 10/2010 | Szczerba et al. |
| 2010/0253596 A1 | 10/2010 | Szczerba et al. |
| 2010/0253597 A1 | 10/2010 | Seder et al. |
| 2010/0253598 A1 | 10/2010 | Szczerba et al. |
| 2010/0253599 A1 | 10/2010 | Szczerba et al. |
| 2010/0253600 A1 | 10/2010 | Seder et al. |
| 2010/0253601 A1 | 10/2010 | Seder et al. |
| 2010/0253602 A1 | 10/2010 | Szczerba et al. |
| 2010/0253688 A1 | 10/2010 | Cui et al. |
| 2010/0253918 A1 | 10/2010 | Seder et al. |
| 2010/0254019 A1 | 10/2010 | Cui et al. |
| 2010/0289632 A1 | 11/2010 | Seder et al. |
| 2010/0292886 A1 | 11/2010 | Szczerba et al. |
| 2012/0089273 A1 | 4/2012 | Seder et al. |
| 2012/0093357 A1 | 4/2012 | Seder et al. |
| 2012/0169513 A1 | 7/2012 | Szczerba et al. |
| 2012/0169572 A1 | 7/2012 | Seder et al. |
| 2012/0169861 A1 | 7/2012 | Szczerba et al. |
| 2012/0173067 A1 | 7/2012 | Szczerba et al. |
| 2012/0174004 A1 | 7/2012 | Seder et al. |

OTHER PUBLICATIONS

U.S. Appl. No. 12/900,566, Szczerba et al., not publ'd.
U.S. Appl. No. 12/900,539, Szczerba et al., not publ'd.
U.S. Appl. No. 12/903,267, Szczerba et al., not publ'd.
U.S. Appl. No. 12/980,503, Szczerba et al., not publ'd.
U.S. Appl. No. 12/979,432, Szczerba et al., not publ'd.
U.S. Appl. No. 12/980,522, Szczerba et al., not publ'd.
U.S. Appl. No. 12/981,612, Szczerba et al., not publ'd.
U.S. Appl. No. 12/981,602, Szczerba et al., not publ'd.
U.S. Appl. No. 12/982,478, Szczerba et al., not publ'd.

* cited by examiner

VEHICLE OPERATION AND CONTROL SYSTEM FOR AUTONOMOUS VEHICLES ON FULL WINDSHIELD DISPLAY

TECHNICAL FIELD

This disclosure is related to user-defined navigation commands for autonomous vehicles and display thereof on a windscreen.

BACKGROUND

The statements in this section merely provide background information related to the present disclosure and may not constitute prior art.

Driving capabilities may be enhanced if an operator of the vehicle were provided situational awareness of navigational intent of the autonomous driving system to perform navigation maneuvers and thereby build driver confidence in the autonomous driving system. For example, a driver on a curvy highway may desire to know that the autonomous driving system is aware of an upcoming sharp curve in the highway and that the autonomous driving system plans to maneuver the vehicle to complete the upcoming turn.

During ongoing autonomous vehicle operation, situations exist where a driver may desire to operate the vehicle in a manner different than the navigation intent while the vehicle is operating autonomously or semi-autonomously.

Gesture-based user interface systems are known to detect user movements that are input to control various applications. Head-up displays project light upon a screen and the light is converted into a viewable display upon the screen. Head-up displays are known to present information to the operator of the vehicle in an effective manner by reducing strain upon the operator while allowing the operator to remain focused on driving.

SUMMARY

A method to navigate a vehicle utilizing a graphic projection display, includes monitoring a navigation status graphic representing a navigation intent displayed upon the graphic projection display, monitoring a user input indicated to a portion of the graphic projection display, initiating a user-defined navigation command based on the monitored navigation status graphic and the monitored user input, and operating the vehicle in accordance with the user-defined navigation command.

BRIEF DESCRIPTION OF THE DRAWINGS

One or more embodiments will now be described, by way of example, with reference to the accompanying drawings, in which.

DETAILED DESCRIPTION

Figure 1:
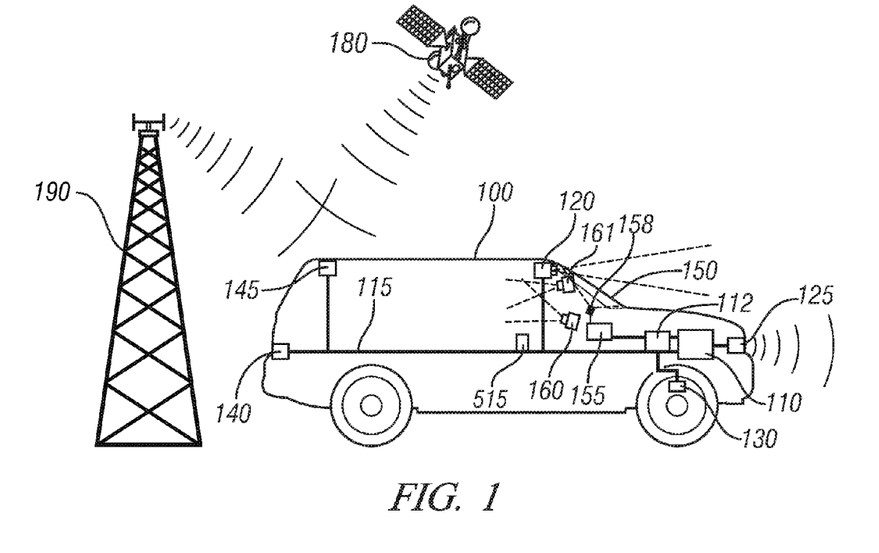
FIG. 1 illustrates an exemplary vehicle equipped with an EVS system, in accordance with the present disclosure.

Referring now to the drawings, wherein the showings are for the purpose of illustrating certain exemplary embodiments only and not for the purpose of limiting the same, FIG. 1 illustrates an exemplary vehicle equipped with an enhanced vision system (EVS), in accordance with the present disclosure. An exemplary EVS system is disclosed in Co-pending U.S. application Ser. No. 12/417,077, which is incorporated herein by reference. For purposes of this disclosure, the terms "operator," "user" and "driver" will be used interchangeably herein. Vehicle 100 can be a fully autonomous driving vehicle or can be a semi-autonomous driving vehicle including adaptive cruise control and/or automatic lane changing. The vehicle 100 includes an EVS system manager 110; a user input module (UIM) 515; a graphic projection display 250 (shown in FIG. 2), vehicle sensor systems, including camera system 120 and radar system 125; vehicle operation sensors, including vehicle speed sensor 130; information systems, including GPS device 140 and wireless communication system 145; head-up display (HUD) 150; EVS graphics system 155; graphics projection system 158; and occupant eye location sensing system 160. The EVS system manager 110 includes a programmable processor including programming to monitor a navigation status graphic displayed upon the graphic projection display (e.g., HUD 150), monitor a user input indicated to a portion of the graphic projection display and initiate a user-defined navigation command based on the monitored navigation status graphic and the monitored user input, wherein the autonomous driving system (ADS) 112 operates the vehicle in accordance with the user-defined navigation command. The EVS system manager can communicate directly with various systems and components including the ADS 112, or the EVS system manager can alternatively or additionally communicate over a LAN/CAN system 115. The EVS system manager utilizes information regarding the operational environment of the vehicle (i.e., autonomous navigation intent) derived from a number of inputs (i.e., ADS 112) and user-based inputs directed to a portion of the graphic projection display (e.g., HUD 150) to initiate a user-defined navigation command. Discussed in further detail with reference to FIG. 4, the UIM 515 receives user inputs indicated to a portion of the graphic projection display 250 (e.g., HUD 150), wherein the user inputs are monitored by the EVS system manager 110. Camera system 120 includes a camera or image capturing device taking periodic or sequential images representing a view from the vehicle. The camera or image capturing device of the camera system 120 preferably includes 360 degrees of coverage. Radar system 125 includes a device known in the art utilizing electromagnetic radiation to detect other vehicles or objects located near the vehicle. A number of known in-vehicle sensors are used within a vehicle to monitor vehicle speed, engine speed, wheel slip, and other parameters representative of the operation of the vehicle. Vehicle speed sensor 130 represents one such an in-vehicle sensor, but the scope of the disclosure includes any such sensors for use by the EVS. GPS device 140 and wireless communication system 145 communicate with resources outside of the vehicle, for example, satellite system 180 and cellular communications tower 190. GPS device 140 may be utilized in conjunction with a 3D map database including detailed information relating to a global coordinate received by the GPS device 140 regarding the current location of the vehicle. Information from the vehicle sensor systems and the vehicle operation sensors can be utilized by the EVS system manager 110 to monitor the current orientation of the vehicle. HUD 150 includes a windscreen equipped with features capable of displaying an image projected thereupon while remaining transparent or substantially transparent such that occupants of the vehicle can clearly observe outside of the vehicle through the windscreen. One will appreciate that while HUD 150 includes the windscreen in the front of the vehicle, other surfaces within the vehicle could be used for projection, including side windows and a rear window. Additionally, the view on the front windscreen could be continued upon the front vehicle "A-pillars" and onto the side windows as a continuous image. EVS graphics engine 155 includes display software or programming translating requests to display information from the EVS system manager 110 in graphical representations of the information. The EVS graphics engine 155 includes programming to compensate for the curved and tilted surface of the windscreen and any other surfaces (e.g., non-transparent components 280 shown in FIG. 2) onto which graphics are to be projected. EVS graphics engine 155 controls graphics projection system 158 including a laser or projector device producing an excitation light to project the graphical representations. Occupant eye location sensing system 160 includes sensors known in the art to approximate a location of the head of an occupant and further the orientation or gaze location of the eyes of the occupant. Based upon the output of the occupant eye location sensing system 160, the current location and orientation of the vehicle 100, a user input location and a future navigation maneuver location, EVS system manager 110 can accurately dynamically register the graphical representations to the graphic projection display 250 such that the occupant sees the images overlaid with visual images through the display. Dynamic registration of graphics will be discussed in greater detail with reference to FIG. 6.

Figure 2:
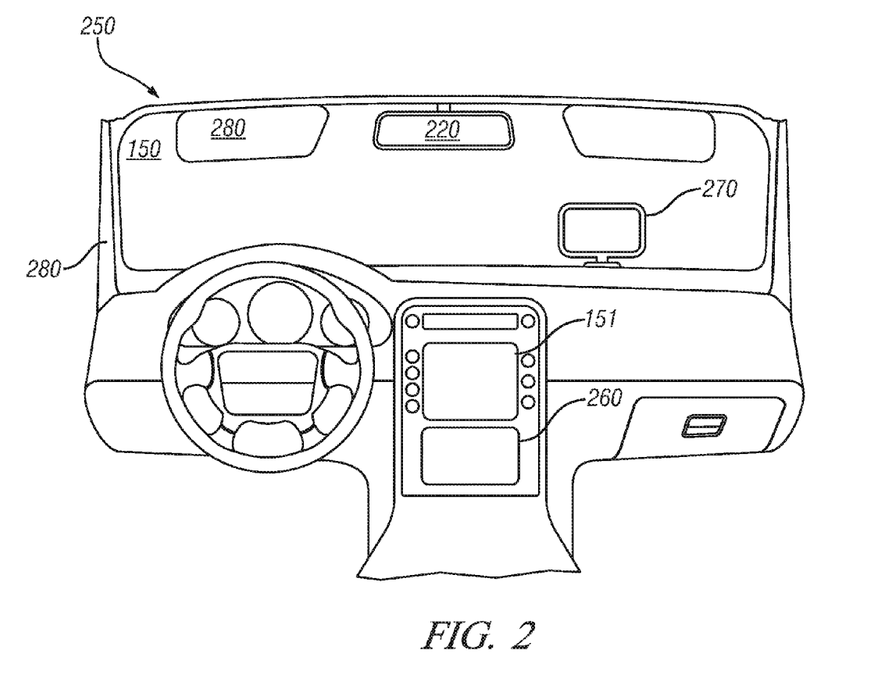
FIG. 2 illustrates graphic projection display embodiments where an image of a view corresponding to the driving scene of a vehicle and graphics can be displayed thereon, in accordance with the present disclosure.

The EVS described above includes eye sensing and head sensing devices allowing estimation of eye location, allowing dynamic registration of images upon the graphic projection display 250 (e.g., HUD 150) such that the images correspond to a view of the operator. However, it will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle can be used to estimate a position of the driver's head. In another embodiment, manual adjustment of a rearview mirror or mirrors can be used to estimate location of an operator's eyes. It will be appreciated that a combination of methods, for example, seat position and mirror adjustment angle, can be utilized to estimate operator head location with improved accuracy. Many methods to accomplish accurate dynamic registration of graphics upon the graphic projection display 250 (e.g., HUD 150) are contemplated, and the disclosure is not intended to be limited to the particular embodiments described herein.

An exemplary EVS includes a wide field of view, full windscreen (HUD), a substantially transparent screen including functionality to display graphical images projected thereupon; a HUD image engine including a laser or lasers capable of projecting images upon the windscreen, wherein the windscreen is an embodiment of the graphic projection display 250 illustrated in FIG. 2; input sources deriving data concerning the operating environment of the vehicle; and an EVS system manager including programming to monitor inputs from the input devices, process the inputs and determine critical information relative to the operating environment, and create requests for graphical images to be created by the HUD image engine. However, it will be appreciated that this exemplary EVS is only one of a wide number of configurations that an EVS can take. For example, a vision or camera system is useful to various EVS applications that will be discussed. However, it will be appreciated that an exemplary EVS system can operate without a vision system, for example, providing information available from only a GPS device, 3D map database, and in-vehicle sensors. In the alternative, it will be appreciated that an exemplary EVS system can operate without access to a GPS device or wireless network, instead utilizing inputs only from a vision system and radar system. Many configurations are possible with the disclosed systems and methods, and the disclosure is not intended to be limited to the exemplary embodiments described herein.

FIG. 2 depicts the graphic projection display 250. The graphic projection display 250 includes embodiments where an image of a view corresponding to the driving scene of the vehicle and a graphic (i.e., navigation status graphic or navigation command graphic) can be displayed thereon. The graphic projection display 250 includes the substantially transparent windscreen HUD 150, a touch screen display 260, a human machine interface (HMI) 151 having a display, non-transparent components 280 and a display monitor 270 mounted within the interior of the vehicle. It will be understood that all of the embodiments included with the graphic projection display can project an image of a view corresponding to the driving scene of the vehicle. The image of the view of the driving scene need not be projected upon the substantially transparent windscreen HUD because the actual driving scene is visible through the HUD 150. The driving scene can be depicted from the camera system 120. User inputs indicated to a portion of the graphic projection display 250 corresponding to the driving scene will be discussed in further detail in FIG. 4 with reference to the UIM 515. It will be understood that the vehicle will typically require one of the embodiments of the graphic projection display 250 for displaying a view corresponding to the driving seen thereupon. However, the graphic projection display 250 could include a combination of the embodiments utilized by the vehicle 100. For instance, an image corresponding to the driving scene of the vehicle could be displayed upon both the HMI 151 and the touch screen display 260.

Figure 3:
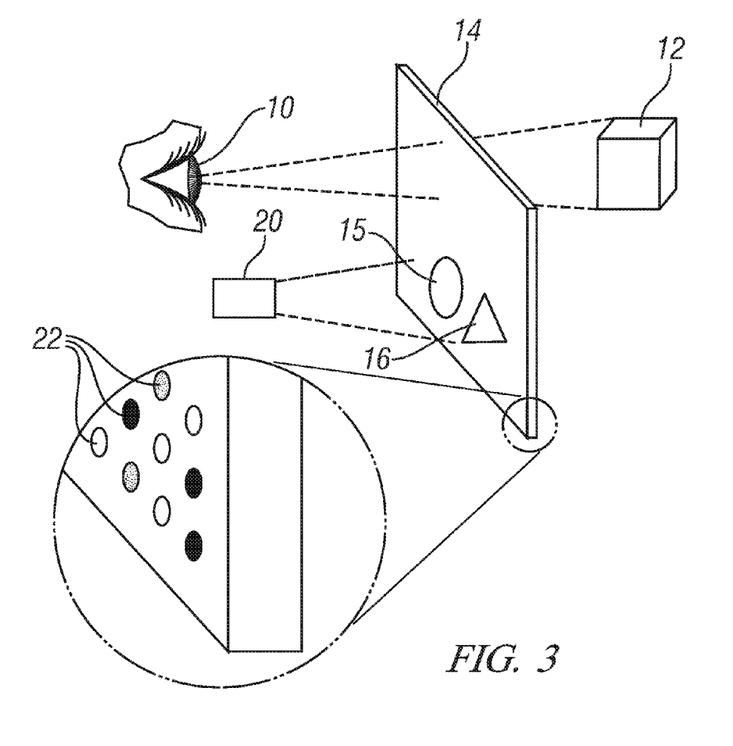
FIG. 3 illustrates a substantially transparent display, in accordance with the present disclosure.

In order to function as a medium through which relevant features are observable while serving as a display device upon which the graphical images may be displayed, the windscreen of the vehicle must be both transparent and capable of displaying images projected by an excitation light source. FIG. 3 illustrates a substantially transparent display, in accordance with the present disclosure. Viewer 10 is able to see an arbitrary object (e.g. cube 12) through substrate 14. Substrate 14 may be transparent or substantially transparent. While viewer 10 sees arbitrary object 12 through substrate 14, the viewer can also see images (e.g. circle 15 and triangle 16) that are created at substrate 14. Substrate 14 may be part of a vehicle windshield, a glass substrate, a plastic substrate, a polymer substrate, or other transparent (or substantially transparent) medium that would be appreciated by one of ordinary skill in the art. Other substrates may complement substrate 14 to provide for tinting, substrate protection, light filtering (e.g. filtering external ultraviolet light), and other functions.

FIG. 3 illustrates illumination of substrate 14 illuminated with excitation light (e.g. ultraviolet light or infrared light) from light sources (e.g. a projector or laser), depicted by device 20. The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

In one embodiment, the excitation light is output by device 20 including a projector. The projector may be a digital projector, the projector may be a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum, the projector may be a liquid crystal display (LCD) projector, the projector may be a liquid crystal on silicon (LCOS) projector, the projector may be an analog projector (e.g. a slide film projector or a movie film projector). One of ordinary skill in the art would appreciate other types of projectors which may be used to project ultraviolet light on substrate 14.

In another embodiment, an excitation light is output from device 20, including a laser. The intensity and/or movement of a laser beam output from device 20 may be modulated to create an image in substrate 14. In down-conversion embodiments, the output from the laser may be ultraviolet light. In up-conversion embodiments, the output from the laser may be infrared light.

FIG. 3 illustrates light emitting material (e.g. light emitting particles 22) dispersed in a substantially transparent substrate. When excitation light is absorbed by the light emitting particles 22, the light emitting particles emit visible light. Accordingly, in down-conversion embodiments, when ultraviolet light is absorbed by light emitting particles 22, visible light is emitted from the light emitting particles. Likewise, in up-conversion embodiments, when infrared light is absorbed by light emitting particles 22, visible light is emitted from the light emitting particles.

FIG. 3 illustrates light emitting material, including light emitting particles 22, dispersed in a substantially transparent substrate. These light emitting particles 22 can be substantially similar particles throughout, or, as illustrated in FIG. 2, the particles can vary in composition. When excitation light is absorbed by the light emitting particles 22, the particles emit visible light. Accordingly, in down-conversion embodiments, when ultraviolet light is absorbed by light emitting particles, visible light is emitted from the light emitting particles. Likewise, in up-conversion embodiments, when infrared light is absorbed by light emitting materials, visible light is emitted from the light emitting particles. Each light emitting particle may be a different type of light emitting material, which emits a different range of wavelengths of visible light in response to a different range of wavelengths of excitation light (e.g. ultraviolet or infrared light).

Light emitting particles 22 may be dispersed throughout substrate 14. In the alternative, as illustrated in FIG. 3, the particles may be disposed on a surface of substrate 14. Light emitting particles 22 may be integrated into substrate 14 by being coated on substrate 14. Light emitting material may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. According to embodiments, each of the light emitting particles has a diameter that is less than about 400 nanometers, each of the light emitting particles may have a diameter that is less than about 300 nanometers. According to embodiments, each of the light emitting particles has a diameter that is less than about 200 nanometers, less than about 100 nanometers, or less than about 50 nanometers. The light emitting particles may be individual molecules.

In another embodiment, the graphic projection display 250 can include the HMI device 151 having the display associated therewith for receiving a projected image of a view corresponding to the driving scene of the vehicle and displaying a graphic thereon. HMI 151 includes a computing device where the operator of the vehicle can input commands to control various systems of the vehicle in signal communication with the HMI 151 and receive desirable information. Methods of projection upon HMI displays are known in the art and this disclosure is not meant to be limited to any one method of projection.

In another embodiment, the graphic projection display 250 can include the touch screen display 260 for receiving a projected image of a view corresponding to the driving scene of the vehicle and displaying a graphic thereon. The touch screen display can be the TSIM 149 discussed in detail with reference to FIG. 4. The touch screen display 260 can be the display associated with the HMI device 151 or may be a separate display located within the vehicle. Methods of projection upon touch screen displays are known in the art and this disclosure is not meant to be limited to any one method of projection.

In yet another embodiment, the graphic projection display 250 can include the display monitor 270 for receiving a projected image of a view corresponding to the driving scene of the vehicle and displaying a graphic thereon. The display monitor 270 can be mounted on the vehicle dashboard or located somewhere in the vehicle convenient for viewing by the operator. The display monitor 270 can include a monitor associated with a computer utilized in police vehicles.

In another embodiment, the graphic projection display 250 can include the non-transparent components 280 for receiving a projected image of a view corresponding to the driving scene of the vehicle and displaying a graphic thereon. The non-transparent components 280 can include a dashboard, seats, headrests, structural pillars, roofs, sun visors and steering wheels. The non-transparent components 280 can include a transparent phosphor film reactive to display graphics in response to an excitation projector. Co-pending U.S. application Ser. No. 12/563,407, which is incorporated herein by reference discloses projecting images upon non-transparent components.

Figure 4:
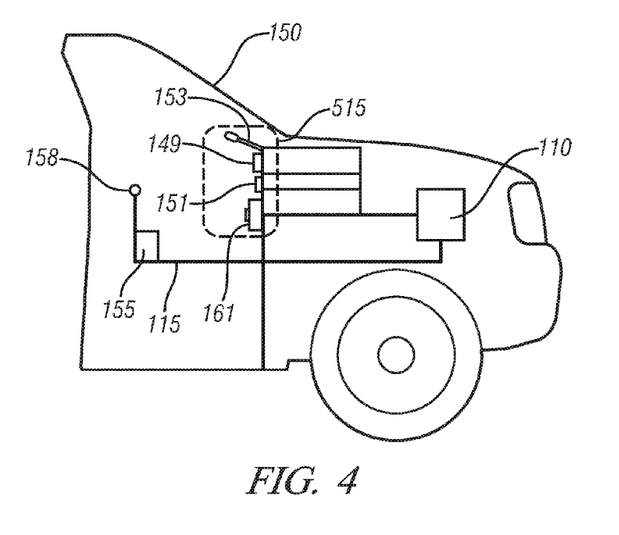
FIG. 4 illustrates the exemplary user input module illustrated in FIG. 1, in accordance with the present disclosure.

Referring to FIG. 4, the exemplary user input module (UIM) 515 for receiving user inputs indicated to a portion of the graphic projection display 250 is illustrated, in accordance with the present disclosure. The user inputs are monitored by the EVS system manager 110 and eventually utilized for displaying and manipulating graphics upon the graphic projection display 250 corresponding to the driving scene. It will be appreciated that the UIM 515 includes embodiments of user input devices and modules, and that the exemplary vehicle may only include one of the input devices and modules included within the UIM 515 for receiving and monitoring a user input indicated to a portion of the graphic projection display 250. However, embodiments are envisioned where the vehicle can include variations of the user input devices and modules included within the UIM 515 and selected ones can be enabled based on a vehicle user's preference. The UIM 515 includes an imaging device 161, a touch screen input module (TSIM) 149, the HMI device 151 and a controller device 153.

The TSIM 149 can be configured to receive touch gestures of a hand or finger of the user upon the module and indicated to a portion of the graphic projection display corresponding to the driving scene. The TSIM 149 can additionally include a display corresponding to the driving scene of the vehicle and configured to dynamically register graphics thereon. As will become apparent, the received touch gestures of the hand of the user provides a touch-based user interface for manipulating the navigation status graphic representing the navigational intent displayed upon the graphic projection display.

Various devices are known in the art that can receive touch gestures of a hand or finger of a user. The TSIM 149 can be a touch screen device including a display screen which can identify the occurrence, location and position of a touch inside the display region. The display can correspond to a view of the driving scene of the vehicle. The TSIM 149 can be integrated within the HMI device 151, the display monitor 270, a personal digital assistant (PDA) or a cell phone, all having displays corresponding to the driving scene of the vehicle. Hence, the TSIM 149 facilitates a user to interact with what is displayed on the display (i.e., the driving scene and navigation status graphic), rather than indirectly with a mouse or touchpad and it lets the user perform the touch gestures without necessitating such middle devices.

Furthermore, various methods are known in the art for monitoring and receiving touch gestures of the hand or finger of the user. In a non-limiting embodiment, the TSIM 149 can be a resistive touch screen display composed of standard glass sheet that is coated with a thin conductive and a resistive metallic sheet, wherein an electrical current travels between the two layers and monitors the touch gesture when the two layers contact each other in the same location and thereby interrupting the electrical current. In another non-limiting embodiment, the TSIM 149 can be a surface wave touch screen display utilizing ultrasonic waves to process user inputs from the screen. In other words, the surface wave touch screen display utilizes a transducer identifying if a signal has been altered by a touch at any movement, where ultrasonic waves flow over the entire screen when the user touches the display at a specific location. In yet another non-limiting embodiment, the TSIM 149 can be a capacitive touch screen display composed of an indium tin oxide sheet that stores electrical charge and is positioned on a glass layer of the display. When the hand or finger of the user input contacts the display, a small quantity of the charge is transmitted to the hand or finger of the user and the quantity of charge on the capacitive sheet reduces. A processor associated therewith computes the comparative variation and determines the precise location where the touch-gesture took place, the location corresponding to the location on the driving scene of the vehicle. In yet another non-limiting embodiment, the TSIM 149 can include infrared touch screen displays. Infrared touch screen displays can react to infrared or thermal waves (i.e., heat). Infrared touch screen displays can further utilize vertical and horizontal infrared sensors around the perimeter to create a grid, and thus pinpoint the exact location where the display screen has been touched by the hand or finger of the user.

It should be appreciated that the TSIM 149 is not to be limited to any of the devices and methods discussed above and that the TSIM 149 only be capable of receiving touch gestures of a hand or finger of the user upon the module 149 and indicated to a portion of the graphic projection display 250 corresponding to the driving scene, wherein the received touch gestures of the hand of the user provides a touch-based user interface for manipulating the navigation status graphic representing navigation intent of the vehicle displayed upon the graphic projection display.

The controller device 153 includes a mechanism, such as a joystick, mouse, lever, stylus, touch pad or other accessory for receiving user manipulations indicated to a portion of the graphic projection display 250. As will become apparent, the received user manipulations to the controller device 153 can provide a controller-based interface for manipulating the navigation status graphic representing navigation intent of a vehicle displayed upon the graphic projection display.

The imaging device 161 includes capturing images of the hand of the user and utilizing software associated therewith to monitor the location and orientation of the hand of the user to provide an optical image. The images can be captured utilizing infrared or ultraviolet technology. The optical image can be processed to generate three-dimensional (3D) mapping of the hand movement of the user. As will become apparent, the optical image of the hand movement provides a gesture-based user interface for manipulating a navigation status graphic representing navigation intent of a vehicle displayed upon the graphic projection display. Therefore, user hand movements (i.e., gesturing) detected by the imaging device 161 can be used in place of tactile interface elements such as a mouse, lever, joystick, knob or other accessory. The imaging device 161 requires capturing a sequence of images, wherein the location and the orientation of the hand of the user is monitored for each image to provide the optical image of the hand movement of the user. The software associated with the imaging device 161 can be integrated within the imaging device 161 and in signal communication with the EVS system manager 110 by suitable dedicated circuitry. Additionally, the software associated with the imaging device 161 can be integrated within the EVS system manager 110.

Various methods are known in the art that use imaging devices to process optical images based on the monitored location and orientation of an object (i.e., a hand) to generate 3D mapping of the object. PCT International Publication WO 2007/043036, which is incorporated herein by reference, discloses a method and system based on projecting a laser speckle pattern onto an object, and then analyzing an image of the pattern on the object. U.S. Pat. No. 6,100,517, which is incorporated herein by reference, discloses a method of using pulsed modulation in order to measure time of flight of light from an object to a detector, where a camera creates an image indicating distances to points in objects in a scene. U.S. Publication No. 2010/0020078 A1, which is incorporated herein by reference, discloses a method of illuminating an object with beams of radiation and generating intensity-based 3D mapping of the object. The present disclosure is not limited to any of the methods discussed above, as long as the imaging device 161 can monitor the location and the orientation of a hand of the user and process an optical image of hand movement of the user based on the monitored location and orientation of the hand of the user, wherein the optical image of the hand movement can provide a gesture-based user interface for manipulating the navigation status graphic representing navigation intent of the vehicle displayed upon the graphic projection display.

The HMI device 151, discussed above, can include speech recognition software where the user input can be a speech input indicated to the portion of the graphic projection display. As will become apparent, the speech input provides a speech-based user interface for manipulating a navigation status graphic representing navigation intent of a vehicle displayed upon the graphic projection display.

Figure 5:
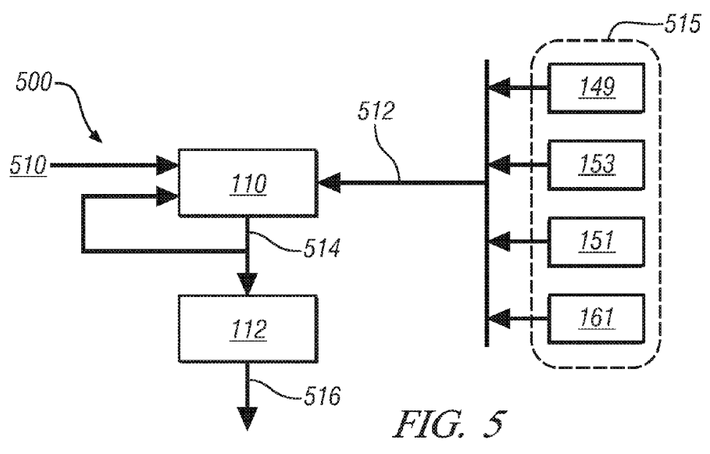
FIG. 5 illustrates an exemplary information flow for operating a vehicle in accordance with a user-defined navigation command that is initiated based on a navigation status graphic representing navigation intent displayed upon the graphic projection display and a user input indicated to a portion of the graphic projection display, in accordance with the present disclosure.

Referring to FIG. 5, an exemplary information flow for operating a vehicle in accordance with a user-defined navigation command that is initiated based on a navigation status graphic representing navigation intent displayed upon the graphic projection display and a user input indicated to a portion of the graphic projection display is illustrated in accordance with the present disclosure. Process 500 includes an EVS system manager 110 monitoring a navigation status graphic 510 displayed upon a graphic projection display and monitoring a user input 512, the user input indicated to a portion of the graphic projection display. The user input 512 is generated by the UIM 515 including at least one of the TSIM 149, the controller device 153, the HMI device 151 and the imaging device 161. The navigation status graphic 510 represents navigation intent of the vehicle. For instance, the navigation status graphic 510 can be a graphical arrow representing the navigation intent of the vehicle to perform an upcoming turn in the road (i.e., future navigation maneuver). It will be appreciated that the navigation status graphic 510 displayed upon the graphic projection display is utilized to provide confidence and situational awareness to the driver of the navigational intent of the ADS 112.

Based on the navigation status graphic 510 representing the navigation intent and the user input 512, the EVS system manager 110 initiates a user-defined navigation command 514 that is input to the ADS 112. The ADS 112 thereby outputs operation commands 516 to various systems (e.g., adaptive cruise control) for operating the vehicle in accordance with the user-defined navigation command 514. As will become apparent, the EVS system manager 110 enables the driver of the vehicle to manipulate the navigation status graphic 510 displayed upon the graphic projection display, wherein the navigation status graphic 510 represents autonomous navigation intent of the vehicle during on-going vehicle operation. Hence, by manipulating the navigation status graphic 510, the driver of the vehicle is able to change the autonomous navigation intent by initiating the user-defined navigation command 514 to operate the vehicle. In order to manipulate the navigation status graphic 510, the monitored user input 512 indicated to the portion of the graphic projection display corresponds to a location at which the navigation status graphic is displayed. Described in detail below with reference to FIG. 8, a navigation command graphic representing the user-defined navigation command 514 can be displayed upon the graphic projection display. The user-defined navigation command 514, including the navigation command graphic representing the navigation command 514, can be fed back to the EVS system manager 110 and designated as a new navigation status graphic representing the navigation intent of the vehicle.

Figure 6:
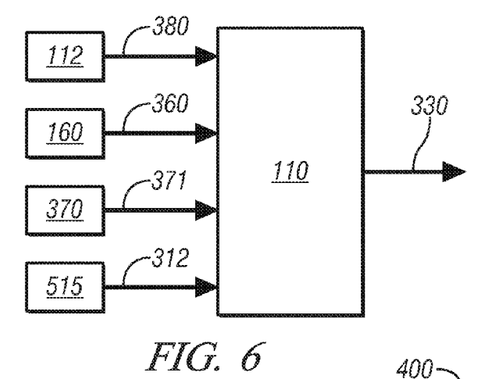
FIG. 6 illustrates an exemplary information flow for dynamically registering a graphic on a driving scene utilizing the graphic projection display, in accordance with the present disclosure.

FIG. 6 illustrates an exemplary information flow for dynamically registering a graphic on a driving scene utilizing the graphic projection display 250 including an EVS system manager 110 monitoring inputs from the occupant eye location sensing system 160, inputs from a vehicle location and orientation module 370, inputs from the ADS 112 and inputs from the UIM 515 to thereby generate display requirements 330, in accordance with the present disclosure. The graphic can include a navigation status graphic representing navigation intent of the vehicle. The graphic can further include a navigation command graphic representing a navigation command. The graphic can further include a feedback graphic (e.g., a cursor) illustrating movement of the monitored user input indicated to the portion of the graphic projection display. In other words, the feedback graphic illustrates the movement of the monitored user input to align the user input with the navigation status graphic in order to manipulate the navigation status graphic and initiate a user-defined navigation command to operate the vehicle.

With reference to FIGS. 1 and 6, the occupant eye location sensing system 160 includes sensors known in the art to approximate a location of the head of an occupant and further the orientation or gaze location of the eyes of the occupant. An occupant can be an operator of the vehicle or a passenger within the vehicle. Head and eye sensing devices are known in the art and will not be discussed in great detail herein. For the purposes of this disclosure, a camera based device is utilized in combination with image recognition software to estimate a three-dimensional head location within the vehicle, able to be coordinated with a vehicle coordinate system, and a direction of occupant's gaze based upon image recognition programming. An eye location input 360 is input to the EVS system manager 110.

A current location and orientation of the vehicle can be determined by methods known in the art such as, but not limited to, monitoring the GPS device 140 in conjunction with a 3D map database and a digital compass including detailed information relating to a global coordinate received by the GPS device 140 regarding the current location of the vehicle. The current location and orientation can also be determined by vehicle kinematics including at least vehicle speed and yaw rate, available through sensors monitoring vehicle operation and/or monitoring accelerometer readings. Utilizing the methods discussed above, the vehicle location and orientation module 370 generates a vehicle location and orientation input 371 to the EVS system manager 110.

The UIM 515 can be configured to monitor the user input location indicated to a portion of the graphic projection display. In other words, the location of the user input refers to the location of the indicated portion upon the graphic projection display corresponding to the driving scene at which the monitored user input is directed towards. A user input location 312 is input to the EVS system manager 110.

The ADS can be configured to determine a future navigation maneuver location. The future navigation maneuver location can refer to when and where the vehicle will perform a navigation maneuver in response to either the navigation intent or the user-defined navigation command. For instance, the navigation intent may pertain to a future navigation maneuver such as a lane merge due to the current lane in which the vehicle is traveling ending up the road. A future navigation maneuver location 380 is input to the EVS system manager 110.

The EVS system manager thereby 110 monitors the eye location input 360, the vehicle location and orientation input 371, the future navigation maneuver location input 380 and the user input location 312 to thereby generate display requirements 330 for dynamically registering the graphic upon the graphic projection display. It is appreciated that if the graphic includes the feedback graphic, it may only be necessary to monitor the eye location input 360 and the user input location 371 to generate the display requirements 330 for dynamically registering the feedback graphic upon the graphic projection display 250.

Therefore, based on the occupant eye location, the user input location, the current location and orientation of the vehicle, the future navigation maneuver location (i.e., navigation intent/user-defined navigation command), an estimated point of intersection between the future navigation maneuver and the operator's eyes can be determined upon the display, thereby enabling graphical images to by dynamically registered to a location upon the windscreen corresponding to the driving scene of the vehicle, such that the occupant of the vehicle may view where the vehicle will autonomously perform the future navigation maneuver (e.g., turn in road) and the navigation status graphic representing the navigation intent to perform the future navigation maneuver.

Figure 7:
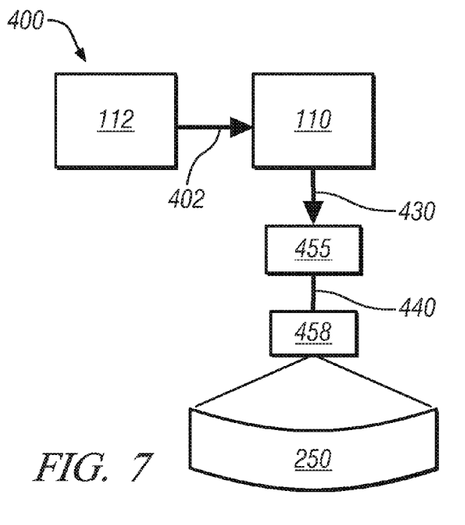
FIG. 7 schematically illustrates an exemplary information flow for determining and displaying a navigation status graphic, in accordance with the present disclosure.

Referring to FIG. 7, an exemplary information flow for determining and displaying a navigation status graphic is illustrated in accordance with an exemplary embodiment of the present disclosure. Process 400 includes an EVS system manager 110 monitoring information from various sources and generating display requirements 430, graphic module 455 monitoring the display requirements 430 from the EVS system manager 110 and generating graphics commands 440, and a graphic projection module 458 projecting light upon a graphic projection display 250. As aforementioned, the graphic projection display can include the substantially transparent windscreen head-up display 150, the non-transparent components 280, the vehicle touch screen 260, the HMI device 151, the display monitor 270 or any screen or display displaying projected graphics and an image of a view corresponding to the driving scene of the vehicle. It is appreciated that the graphic projection display 250 is not meant to be limited to any of the above displays.

The EVS system manager 110 monitors autonomous inputs 402 from the autonomous driving system 112. The autonomous inputs 402 describe the autonomous navigation intent of the vehicle. For instance, the autonomous navigation intent can include upcoming or future navigation maneuvers the vehicle must partake due to curvatures of road, lane merges, traffic jams or speed changes. The graphics module 455 utilizing the display requirements 430 generated by the EVS system manager 110 and based on the autonomous inputs 402, determines the navigation status graphic representing the autonomous navigation intent of the vehicle. The navigation status graphic representing the autonomous navigation intent of the vehicle is indicated by the graphics command 440 input to the graphics projection module 458. It will be appreciated that the display requirements 430 include dynamically registering a location of the graphic upon the heads-up display corresponding to the driving scene of the vehicle. Dynamically registering the graphic upon the heads-up display corresponding to the driving scene is discussed above and will not be discussed in detail herein. The graphics projection module 458 displays the graphic onto the driving scene of the vehicle utilizing the graphic projection display 250. It will be further appreciated when the graphic projection display 250 includes one of the substantially transparent windscreen head-up display 150 or the non-transparent components 280, the graphic module 455 and the graphic projection module 458 correspond to the EVS graphics engine 155 and the graphic projection system 158, respectively. The navigation status graphic can include an arrow representing future navigation maneuvers the vehicle will autonomously partake. The navigation status graphic can further include a speed gauge graphic representing the speed at which the vehicle is currently traveling. It will be understood that the speed gauge graphic could be manipulated based on a user-input to initiate a speed increase or decrease based on the manipulated speed gauge graphic.

Figure 8:
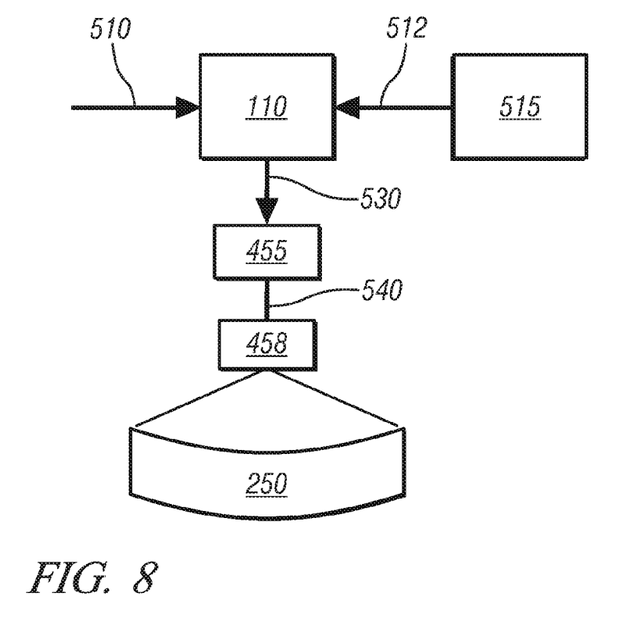
FIG. 8 schematically illustrates an exemplary information flow for determining and displaying a navigation command graphic representing a user-defined navigation command, in accordance with the present disclosure.

Referring to FIG. 8, a schematic depiction of an exemplary information flow for determining and displaying a navigation command graphic representing a user-defined navigation command is illustrated in accordance with an exemplary embodiment of the present disclosure. The process includes an EVS system manager 110 monitoring information from various sources and generating display requirements 530, graphic module 455 monitoring the display requirements 530 and generating graphics commands 540, and a graphic projection module 458 projecting light upon a graphics projection display 250. As aforementioned, the graphic projection display can include the substantially transparent windscreen head-up display 150, the non-transparent components 280, the vehicle touch screen 260, the HMI device 151, the display monitor 270 or any screen or display displaying projected graphics and an image of a view corresponding to the road scene of the vehicle. It is appreciated that the graphic projection display 250 is not meant to be limited to any of the above displays.

The EVS system manager 110 monitors the user-input 512 and the navigation status graphic 510 to initiate the user-defined navigation command, and thereby operate the vehicle. As aforementioned, the user-input 512 is indicated to a portion of the graphic projection display 250 and is generated by the UIM 515. Initiating the user-defined navigation command includes manipulating the navigation status graphic based upon the monitored user input when the indicated portion of the monitored user input corresponds to a location at which the navigation status graphic 510 is displayed. For instance, an operator of a vehicle can view a navigation status graphic 510 displayed upon the graphic projection display 250 representing the navigational intent of the vehicle to continue driving in the center lane of travel. Utilizing the imaging device 161 to provide a gesture-based user interface, the user can manipulate the navigation status graphic displayed upon the display to perform a navigation maneuver such as lane change by gesturing a grab-and-drag hand movement to manipulate the navigation status graphic 510. The user-defined navigation command corresponds to the manipulated navigation status graphic. The navigation command graphic representing the user-defined navigation command is indicated by the graphics command 540 and input to the graphics projection module 458. It will be appreciated that the display requirements 530 include dynamically registering a location of the graphic upon the graphic projection display corresponding to the driving scene of the vehicle. Dynamically registering the graphic upon the heads-up display corresponding to the driving scene is discussed above and will not be discussed in detail herein. The graphics projection system 458 displays the navigation command graphic onto the driving scene of the vehicle utilizing the graphic projection display 250.

Figure 9:
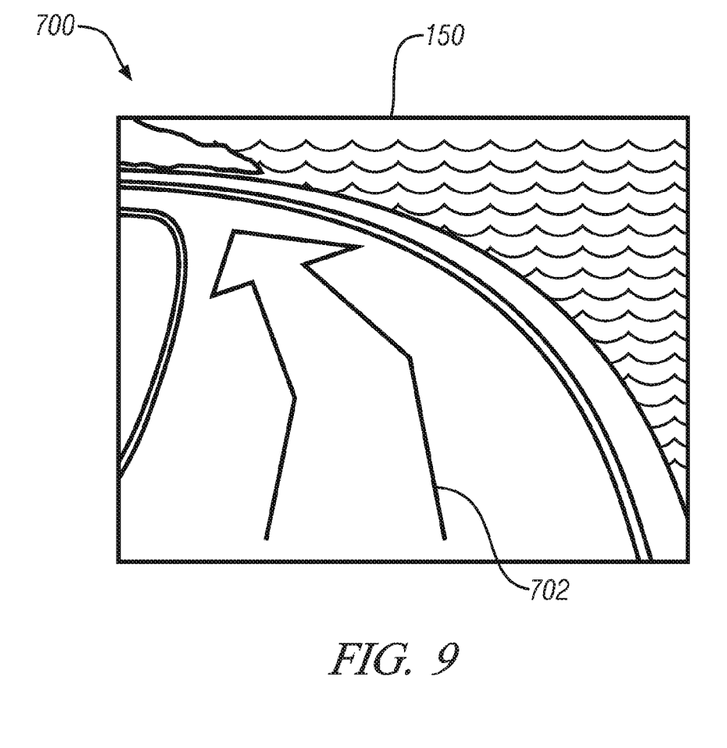
FIGS. 9-11 illustrate driving scenes including graphics dynamically registered upon a graphic projection display of a vehicle, in accordance with the present disclosure.

Referring to FIG. 9, a driving scene 700 is illustrated through a substantially transparent windscreen head-up display 150 of a vehicle. This example is not limited to the windscreen head-up display 150 and can utilize any of the other embodiments included within the graphic projection display 250, including an image of a view corresponding to the driving scene displayed thereon. Utilizing methods described above, navigation status graphic 702 is dynamically registered upon the substantially transparent windscreen head-up display 150 representing the navigational intent of the vehicle. As aforementioned, the vehicle can operate autonomously or semi-autonomously including adaptive cruise control and/or automatic lane changing. The navigation status graphic 702 includes an arrow dynamically registered upon the head-up display 150 such that the location of the navigation status graphic 702 corresponds to the driving scene of the vehicle. In this non-limiting example, the navigation status graphic 702 represents a future navigation maneuver, e.g., a turn in the road that the vehicle will autonomously partake. The navigation status graphic 702 enables the user of the vehicle to view where the vehicle will autonomously perform the future navigation maneuver. The navigation status graphic 702 representing the turn in the road (i.e., future navigation maneuver) provides situational awareness and confidence to the driver of the vehicle that the autonomous or semi-autonomous functions of the vehicle are operating correctly.

Figure 10:
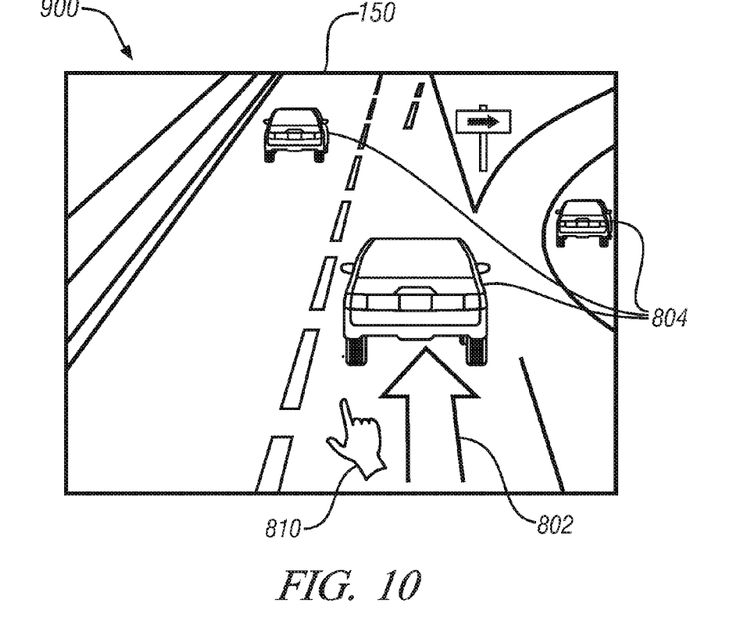

Referring to FIG. 10, a driving scene 900 is illustrated through a substantially transparent windscreen head-up display 150 of a vehicle. This example is not limited to the windscreen head-up display 150 and can utilize any of the other embodiments included within the graphic projection display 250, including an image of a view corresponding to the driving scene of the vehicle displayed thereon. Traffic vehicles 804 can be viewed through the windscreen head-up display 150. Utilizing methods described above, navigation status graphic 802 is dynamically registered upon the substantially transparent windscreen head-up display 150 corresponding to the driving scene of the vehicle and representing the navigation intent of the vehicle. In this non-limiting example, the vehicle is capable of operating autonomously. The navigation status graphic 802 includes an arrow representing that the vehicle is traveling in the right lane behind one of the traffic vehicles 804. Feedback graphic 810 includes a cursor graphic (i.e., a hand graphic) illustrating movement of a monitored user input indicated to a portion of the head-up display 150. The feedback graphic can be utilized to align the movement of the monitored user input for manipulating the navigation status graphic 802 displayed upon the head-up display 150. For instance, the feedback graphic 812 can illustrate movement of a monitored hand of a user utilizing a gesture-based user interface such that the feedback graphic 810 can be utilized to align the movement of the monitored hand of the user for manipulating the navigation status graphic 802. It is appreciated that the user of the vehicle can initiate a user-defined navigation command to operate the vehicle by manipulating the navigation status graphic 802 based on the user-input.

Figure 11:
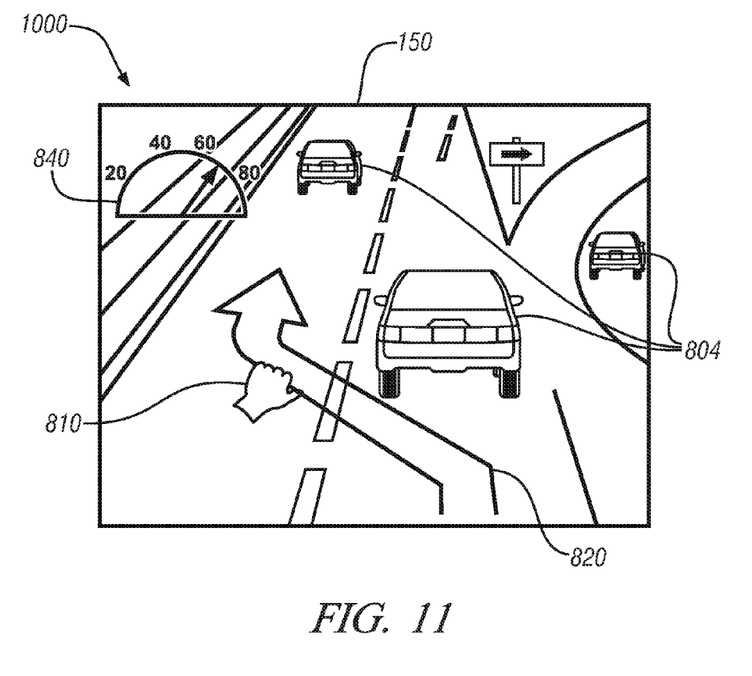

Referring to FIG. 11, driving scene 1000 illustrates the driving scene 900 shown in FIG. 10 as illustrated through the substantially transparent windscreen head-up display 150 of a vehicle. In this non-limiting example, the user of the vehicle has manipulated the navigation status graphic 802 illustrated in FIG. 10 to initiate a user-defined navigation command. Navigation command graphic 820 represents the user-defined navigation command ordering the vehicle to change lanes and pass the traffic vehicle 804 in the right lane. In a non-limiting example, the user input could include utilizing the imaging device to provide the gesture-based interface for manipulating the navigation status graphic 802 illustrated in FIG. 10 to initiate the user-defined navigation command. The gesture-based interface can include the grab-and-drag hand movement indicated to the portion of the head-up display 150 corresponding to the navigation status graphic to thereby manipulate the navigation status graphic, initiate the user-defined navigation command and determine the navigation command graphic 820. The navigation command graphic 820 includes an arrow representing the user-defined navigation command to change lanes and pass the traffic vehicle 804. It is further appreciated that a second navigation status graphic 840 can include a vehicle speed gauge graphic representing the speed at which the vehicle is currently traveling (i.e., navigation intent). The user of the vehicle could initiate a second user-defined navigation command by manipulating the second navigation status graphic 840 to increase or decrease the speed of the vehicle in the same manner discussed above.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to navigate a vehicle utilizing a graphic projection display, comprising:
    executing in an enhanced vision system (EVS) system manager the following steps:
        monitoring an eye location of the user;
        estimating a gaze location of the user based on the monitored eye location, the gaze location of the user describing a point on a transparent windscreen where eyes of the user are focused;
        monitoring a navigation status graphic displayed upon the graphic projection display, the navigation status graphic representing a navigational maneuver that the vehicle will autonomously partake at an upcoming location upon a currently travelled roadway, wherein the navigation status graphic is dynamically registered at a location upon the graphic projection display corresponding to the driving scene of the vehicle based upon the gaze location of the user;
        monitoring a user input indicated to a portion of the graphic projection display corresponding to the location at which the navigation status graphic is presently displayed;
        manipulating the presently displayed navigation status graphic based upon the monitored user input;
        initiating a user-defined navigation command corresponding to the manipulated navigation status graphic; and
        operating the vehicle with an autonomous driving system in accordance with the user-defined navigation command.

2. The method of claim 1 wherein the graphic projection display comprises a substantially transparent windscreen head-up display comprising one of light emitting particles or microstructures over a predefined region of the windscreen permitting luminescent display while permitting vision therethrough.

3. The method of claim 1 wherein the graphic projection display comprises one of a touch screen display, a human machine interface display, non-transparent components and a display monitor.

4. The method of claim 3 further comprising:
    projecting, at a graphic projection module, an image of a view corresponding to a driving scene of the vehicle upon the graphic projection display.

5. Method of claim 1 wherein monitoring a navigation status graphic representing navigation intent comprises:
    monitoring an autonomous driving system;
    determining the navigational maneuver that the vehicle will autonomously partake based on the monitored autonomous driving system;

determining the navigation status graphic representing the navigational maneuver;

dynamically registering, at a graphics module, the location of the navigation status graphic upon the graphic projection display corresponding to a driving scene of the vehicle; and projecting, at the graphics projection module, the navigation status graphic upon the graphic projection display.

6. Method of claim 1 further comprising:

determining a navigation command graphic representing the user-defined navigation command;

dynamically registering, at a graphics module, a location of the navigation command graphic upon the graphic projection display corresponding to the driving scene of the vehicle; and projecting, at the graphics projection module, the navigation command graphic upon the graphic projection display.

7. The method of claim 6 further comprising:

wherein dynamically registering the location of the navigation command graphic upon the graphic projection display corresponding to the driving scene is based upon the occupant eye location.

8. The method of claim 1 further comprising:

determining, in the EVS system manager, a feedback graphic illustrating movement of the monitored user input indicated to the portion of the graphic projection display;

dynamically registering, at a graphics module, a location of the feedback graphic upon the graphic projection display corresponding to a driving scene of the vehicle; and projecting, at a graphics projection module, the feedback graphic upon the graphic projection display.

9. The method of claim 1 wherein monitoring the user input indicated to the portion of the graphic projection display comprises:

monitoring a location and an orientation of a hand of the user;

processing an optical image of hand movement of the user based on the monitored location and orientation of the hand of the user; and wherein the optical image of the hand movement provides a gesture-based user interface for manipulating the navigation status graphic representing the navigational maneuver displayed upon the graphic projection display.

10. The method of claim 1 wherein monitoring the user input indicated to the portion of the graphic projection display comprises:

receiving touch gestures of a hand of the user upon a touch screen, the touch gestures indicated to the portion of the graphic projection display; and wherein the received touch gestures provides a touch-based user interface for manipulating the navigation status graphic representing the navigational maneuver displayed upon the graphic projection display.

11. The method of claim 1 wherein monitoring the user input indicated to the portion of the graphic projection display comprises:

receiving user manipulations at a controller device, the user manipulations indicated to the portion of the graphic projection display; and wherein the received user manipulations provides a controller-based interface for manipulating the navigation status graphic representing the navigational maneuver displayed upon the graphic projection display.

12. Method to navigate a vehicle utilizing a substantially transparent windscreen head-up display, comprising:

executing in an enhanced vision system (EVS) system manager the following steps:

monitoring an eye location of the user;

estimating a gaze location of the user based on the monitored eye location, the gaze location of the user describing a point on the substantially transparent windscreen where eyes of the user are focused;

monitoring at least a first navigation status graphic displayed upon the substantially transparent windscreen head-up display representing a navigational maneuver that the vehicle will autonomously partake at an upcoming location upon a currently travelled roadway, wherein the navigation status graphic is dynamically registered at a location upon the substantially transparent windscreen head-up display corresponding to the driving scene of the vehicle based upon the gaze location of the user;

monitoring a user input indicated to a portion of the substantially transparent windscreen head-up display corresponding to the location at which the first navigation status graphic is presently displayed;

manipulating the first navigation status graphic displayed upon the substantially transparent windscreen head-up display based upon the monitored user input;

initiating a user-defined navigation command corresponding to the manipulated first navigation status graphic;

determining a navigation command graphic representing the user-defined navigation command;

dynamically registering, at a graphics system, a location of the navigation command graphic upon the substantially transparent windscreen head-up display corresponding to the driving scene of the vehicle;

projecting, at a graphics projection module, the navigation command graphic upon the substantially transparent windscreen head-up display; and operating the vehicle with an autonomous driving system in accordance with the user-defined navigation command;

wherein the substantially transparent windscreen head-up display comprises one of light emitting particles or microstructures over a predefined region of the windscreen permitting luminescent display while permitting vision therethrough.

13. The method of claim 12 further comprising:

determining, in the EVS system manager, a feedback graphic illustrating movement of the monitored user input indicated to the portion of the substantially transparent windscreen head-up display;

dynamically registering, at the graphics system, a location of the feedback graphic upon the substantially transparent windscreen head-up display corresponding to the driving scene of the vehicle; and projecting, at the graphics projection module, the feedback graphic upon the substantially transparent windscreen head-up display.

14. The method of claim 13 wherein the feedback graphic comprises a cursor graphic.

15. The method of claim 12 wherein the first navigation status graphic comprises an arrow representing future autonomous navigation turning maneuvers for the vehicle.

16. The method of claim 12 wherein monitoring at least a first navigation status graphic further comprises:

monitoring a second navigation status graphic representing a current vehicle speed, wherein the second navigation graphic comprises a speed gauge graphic.

17. The method of claim 12 wherein the user input comprises a gesture-based user interface, the method further comprising:
- receiving, in the EVS system manager, a grab-and-drag gesture hand movement indicated to the portion of the substantially transparent windscreen head-up display corresponding to the location at which the first navigation status graphic is displayed; and
- wherein manipulating at least the first navigation status graphic displayed upon the substantially transparent windscreen head-up display comprises manipulating the first navigation status graphic based upon the grab-and-drag gesture hand movement.

18. System to navigate a vehicle utilizing a graphic projection display, comprising:
- an enhanced vision system system manager:
    - monitoring an eye location of the user;
    - estimating a gaze location of the user based on the monitored eye location, the gaze location of the user describing a point on a transparent windscreen where eyes of the user are focused;
    - monitoring a navigation status graphic displayed upon the graphic projection display, the navigation status graphic representing a navigational maneuver that the vehicle will autonomously partake at an upcoming location upon a currently travelled roadway, wherein the navigation status graphic is dynamically registered at a location upon the graphic projection display corresponding to the driving scene of the vehicle based upon the gaze location of the user;
    - monitoring a user input indicated to a portion of the graphic projection display corresponding to the location at which the navigation status graphic is presently displayed;
    - manipulating the navigation status graphic based upon the monitored user input;
    - initiating a user-defined navigation command corresponding to the manipulated navigation status graphic;
- an autonomous driving system operating the vehicle in accordance with the user-defined navigation command;
- a graphics system generating a navigation command graphic representing a user-defined navigation command and the navigation status graphic representing the navigation intent; and
- a graphics projection system communicating with the graphics system and displaying the navigation command graphic and the navigation status graphic upon the substantially transparent windscreen head-up display.

* * * * *